(12) United States Patent
Klatt et al.

(10) Patent No.: US 6,342,088 B1
(45) Date of Patent: Jan. 29, 2002

(54) INSULATION MATERIAL

(75) Inventors: Peter Waldemar Klatt; Mark William Townsend, both of Griffith (AU)

(73) Assignee: Ricegrower's Cooperative Limited (AU)

(*) Notice: Subject to any disclaimer, the term of this patent is extended or adjusted under 35 U.S.C. 154(b) by 0 days.

(21) Appl. No.: 09/381,877

(22) PCT Filed: Mar. 26, 1997

(86) PCT No.: PCT/AU97/00196

§ 371 Date: Sep. 24, 1999

§ 102(e) Date: Sep. 24, 1999

(87) PCT Pub. No.: WO98/42630

PCT Pub. Date: Oct. 1, 1998

(51) Int. Cl.$^7$ .................................................. C21B 3/02
(52) U.S. Cl. ............................ 75/300; 75/414; 75/303; 75/433; 75/709
(58) Field of Search .................... 75/300, 414, 303, 75/433, 709

(56) References Cited

U.S. PATENT DOCUMENTS

| 4,295,891 A | * 10/1981 | Daussan et al. ............... 501/99 |
| 4,555,448 A | 11/1985 | Durham ....................... 428/402 |
| 4,659,679 A | 4/1987 | Falk ............................. 501/99 |
| 5,073,281 A | * 12/1991 | Paules et al. .................. 252/62 |
| 5,275,114 A | 1/1994 | Hughes ....................... 106/38.3 |

FOREIGN PATENT DOCUMENTS

| EP | 0 160 940 A2 | 11/1985 |
| SU | 1950541 | 8/1982 |
| SU | 1755906 | 8/1992 |

* cited by examiner

*Primary Examiner*—Melvyn Andrews
(74) *Attorney, Agent, or Firm*—Gifford, Krass, Groh, Sprinkle, Anderson & Citkowski, P.C.

(57) ABSTRACT

A granular thermal insulating material comprising rice hull ash, ceramic clay binder, rice bran and an exfoliating agent, and methods to produce the insulating material.

9 Claims, No Drawings

INSULATION MATERIAL

TECHNICAL FIELD

The invention relates to an insulation material particularly suitable for insulating molten metals in ladies and tundishes.

BACKGROUND ART

Rice hull ash has been used widely in steel mills as an insulating cover on tundishes and ladies containing molten steel. The rice hull ash is a good insulator because it is inexpensive, it flows over and covers the steel surface well and does not crust or cause metals sculls during use. Rice hull ash is produced in various combustion processes around the world. The most desirable rice hull ash contains silica which is substantially amorphous.

The major problem with rice hull ash is that, because of its low bulk density and small particle size, some of the ash becomes airborne when it comes in contact with hot metal. The resulting dust can cause eye injuries as well as being a general nuisance in the immediate work place. Silica/carbon dust also causes electrical hazards in overhead crane switchgear and air conditioning filter systems.

Previous attempts to improve the properties of rice hull ash for molten steel insulation have met with limited success. Attempts have been made to produce agglomerated rice hull ash insulation products in the form of pellets, briquettes or simply agglomerated with a variety of binders. Binders that have been proposed in the past include bentonite clay and starch, starch, cement dust with starch, lime and molasses, rice flour and rice bran, sodium silicate, wood or paper pulp, and lignosulphonates. Examples of several types of rice hull ash insulation materials that have been produced can be found in U.S. Pat. No. 4,440,575 and U.S. Pat. No. 5,0723,281.

Unfortunately, a number a problems were exhibited in the prior art products due to the binders used. These problems include lower melting points causing crusting from the use of sodium silicate. The insulation material does not break down during use which inhibits spread and reduces the insulation effectiveness. Some binders cause excessive smoke or even flame during use which is particularly undesirable. Other binders introduce undesirable elements into the steel including elements such as sulphur. Many of the insulating products are of low density which may be ideal for insulation but result in increase in weight over neat rice hull ash causing higher transport costs.

The present inventors have been recognised that there is a need for an improved thermal insulating material which addresses many of the disadvantages of the prior art rice hull ash insulation materials.

DISCLOSURE OF INVENTION

In a first aspect, the present invention consists in a granular thermal insulating material comprising rice hull ash, ceramic clay binder, bran (preferably rice bran), and an exfoliating agent.

The present invention further consists in a granular thermal insulating material comprising rice hull ash, ceramic clay binder, bran (preferably rice bran), and an exfoliating agent, such that when the insulating material is exposed to a temperature of 1000° C. or more the material exfoliates to form an expanded particulate material.

The thermal insulating material is in the form of granules of a size and shape that allows convenient packaging and transport of the material. Furthermore, the granules are so formed such that in use there is little or no airborne dispersion of the material prior to expansion. Preferably the granules are in the form of pellets or disks.

The invention further consists in a granular thermal insulating material comprising 70 to 95%, preferably 85 to 95% by dry weight rice hull ash, 2 to 20%, preferably 5 to 15% by dry weight ceramic clay binder, 1 to 10% preferably 2 to 7% by weight of bran (preferably rice bran), 0.1 to 10%, preferably 0.2 to 5% by dry weight exfoliating agent, and 1 to 10%, preferably 1 to 5% by weight water.

Ceramic clay binders suitable for the present invention fall within the definition of "refractory clays" having appropriate ranges of the following elements:

$SiO_2 < 55\%, Al_2O_3 > 20\%, K_2O < 1\%, Na_2O < 0.5\%$

A suitable ceramic clay is Bentonite. An other ceramic clay suitable for the present invention is Clay Ceram™ made by Commercial Minerals Limited. Typical formula of this ceramic clay is set out in Table 1.

TABLE 1

Typical Chemical and Physical Properties of Clay Ceram ™ 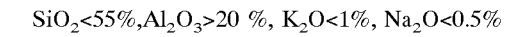

| Component | Formula | Content |
|---|---|---|
| Silica | $SiO_2$ | 52.6% |
| Magnesia | MgO | 0.4% |
| Alumina | $Al_2O_3$ | 32.3% |
| Ferric Oxide | $Fe_2O_3$ | 0.7% |
| Lime | CaO | 0.1% |
| Potash | $K_2O$ | 0.5% |
| Soda | $Na_2O$ | 0.2% |
| Titanium Dioxide | $TiO_2$ | 1.0% |
| Loss on ignition | (1000° C.) | 12.0% |

Bran is generally defined as the outer coating of a cereal grain. Rice bran is particularly suitable for the present invention and is the brown layer removed from a rice grain to produce white rice. Although rice bran is preferably used for the present invention, it will be appreciated that bran derived from other cereals would also be suitable.

It will be appreciated that any exfoliating agent that will cause the granular thermal insulating material to exfoliate (expand or breakdown) in the presence of temperatures of 1000° C. or more and form a finer particulate material would be suitable. Examples of such exfoliating agents include graphite, vermiculite and perlite. The preferred material, however, is exfoliating graphite. When vermiculite or perlite is used in the present invention, approximately five times more vermiculite or perlite is required than graphite as their exfoliating activity is not as great as graphite.

In a more preferred form the granular thermal insulating material comprises about 85% by dry weight rice hull ash, about 5% by dry weight ceramic clay binder, 5% rice bran, about 0.35% by dry weight exfoliating graphite, and about 4% by weight water.

In a second aspect, the present invention consists in a method for the production of a granular thermal insulating material comprising the steps of:

(a) admixing rice hull lash, ceramic clay binder, bran (preferably rice bran) and exfoliating agent;

(b) adding water to the mixture to form a slurry;

(c) forming the slurry mixture into granules; and (d) substantially drying the material.

In a preferred embodiment of the second aspect of the present invention, in step (b) water is added between 25 and 50% by weight of the mixture. More preferably water is added at 30 to 35% weight of the final mixture prior to granulating. Steps (a) and (b) are preferably carried out in the same apparatus but can be carried out in any manner known to the art. A particularly suitable apparatus for the mixing the components and forming the slurry is a slow ribbon blender.

The granulation step (c) can be carried out in any known system for this process. Examples include briquetters, disk pelleters and extrusion pellet presses.

Preferably the granules are pellets of a cylindrical nature with approximate diameters of 4 mm to 12 mm. The more preferred pellet diameter is 8 mm with a length of 4 mm to 20 mm. It will be appreciated that the granules can be of any size suitable for packaging and use in overlaying molten metals.

The drying step (d) can be carried out in any known drying system. In order to reduce the incidence of generation of fines, however, it is preferred that the drying process is gently. In this regard, temperatures of 100° C. to 130° C. have been found to be suitable. Preferably the drying results in a granular thermal insulating material having less than about 5% by weight as retained water.

In a third aspect, the present invention consists in a method of insulating molten steel or metal comprising adding to the molten steel or metal a granular thermal insulating material according to the first aspect of the present invention such that the insulating material is caused to exfoliate (expand or breakdown) on exposure to a temperature of 1000° C. or more from the molten steel or metal thereby forming a thermal insulating layer over the molten steel or metal.

The present invention further consists in use of a granular thermal insulating material according to the first aspect of the present invention for insulating molten steel or metal.

The insulation material is useful in steel industry application including tundishes, ladles, runners, torpedo ladles and ingot tops. In the foundry industry, the insulation material is suitable for use on moulds and runners and in various other metalliferous industries such as copper smelting.

In order that the present invention may be more clearly understood, preferred forms will be described with reference to the following Examples.

Modes of Carrying out the Invention

The addition of a ceramic clay binder, rice bran and an exfoliating agent to rice hull ash prior to pelletising creates a high density granule or pellet which upon heating exfoliates (expands or breaks down) to form an excellent insulating material with none of the drawbacks of prior art insulating materials.

When preparing the insulating material adequate mixing of the ingredients is important. Due to the extremely abrasive nature of the rice hull ash all mixing should preferably be as slow as possible to limit wear and tear on the machinery.

In the Examples described below the mixing is carried out in two steps.

Stage 1 is a thorough dry mixing in a slow ribbon blender but preferably in a long (5 to 10 minute residence time) screw conveyor having overlapping segmented crescent shaped flights.

Approximately two thirds of the screw conveyor is dedicated to dry mixing. The final one third of the conveyor is for wet mixing, a metered amount of water is added in stages to permit even mixing. Water addition is at 20% to 50% by weight and preferably 30% to 35% by weight of the final mixture prior to pelleting is water.

In stage 2 the mixed product is fed to the desired agglomeration process such as Robinson Briquetter, a disk pelletiser or preferably a standard extrusion pellet press (produced by many manufacturers). With the correct amount of water precise temperature control and the correct die hole shape such a pellet press can operate successfully without steam injection. This produces pellets of a cylindrical nature with approximate diameters of 4 mm to 12 mm the preferred diameter is 8 mm with a length of 4 to 20 mm and of a high density.

In stage 3 the pelletes are then dried in any number of proprietary driers at a temperature of 100° C. to 130° C. The main emphasis in this stage is that the drying process should be gentle to reduce the incidence of generation of fines. Pellets are then sieved to remove fines to achieve a product containing less than 5% by weight fines passing a 1 mm sieve. The fines are recycled, the pellets are then filled into suitable packs according to customers' requirements.

This invention is further described in the following Examples.

EXAMPLE 1

Rice hull ash is produced on a continuous basis from a suitable furnace (in this instance a K C Reactor) at a rate of 500 Kg/hr. The ceramic clay binder used was Clay Ceram™ (Table 1) produced by Commercial Minerals Ltd is metered into the mixing screw conveyor via a calibrated feed screw. Exfoliating graphite is metered into the mixing screw conveyor via a calibrated vibratory feeder. Approximately two thirds along this mixing screw conveyor water is added via a calibrated dosing pump. Sufficient mixing occurs by careful design of the crescent flight mixing conveyor which is run at low speeds to obviate excessive wear.

The mixed product is then fed to a standard California Pellet Mill (CPM) extrusion type pellet press (although many other extrusion devices would be suitable) in which further mixing occurs prior to being compacted and extruded through the die. Cylindrical pelletes with approximate diameters of 4 mm and 12 mm can be produced, the preferred diameter is 8 mm as the best compromise between drying efficiency, production efficiency and customer preference.

The formulation is 1000 g Rice Hull Ash, 50 g Clay Ceram™, 50 g rice bran, 350 g water and 4 g exfoliating graphite. The amount of Clay Ceram™ can vary from 25 g to 200 g or more and graphite from 1 g to 10 g or more depending on the final characteristics required by the customer which related to coverage, heat retention ability and end use.

EXAMPLE 2

The process largely as describe in Example 1 is followed, in this Example the mixed product is fed to a Robinson Briquetting Press producing a preferred size of "Pillow" shaped briquette measuring approx 20 mm×15 mm×10 mm. The performance of these briquettes on molten steel is indistinguishable from that of the pellets in Example 1.

EXAMPLE 3

The process largely as described in Example 1 is followed, in this Example the mixed product is fed to a standard "Disc Pelletiser" where a disc rotates slowly, the disc being inclined at approx 30° to the horizontal.

The pellets from this process become essentially spherical. When a mean diameter of 5 mm has been achieved, the pellets are continuously removed and replaced with fresh pre-mixed ash.

These pellets do not achieve the high density as in the previous two Examples and usually only require the following preferred mix of products:

1000 g rice hull ash 50 g Clay Ceram™

50 g rice bran 300 g water 1 g exfoliating graphite

The final performance of these pellets in use in the production of hot metal, however, is extremely satisfactory. In essence the "disc" pelletising process is usually less capital intensive and therefore better suited where there is shorter transport to customers and lower costs are required.

EXAMPLE 4

Further testing has indicated that unexpanded vermiculite (hydrated sheet silcates) can be used to substitue exfoliating graphite in Examples 1 to 3 at a rate of 5 to 1 vermiculite to graphite.

Performance at high temperatures, <1500° C. is somewhat retarded. This product, however, is totally satisfactory for use in iron foundries and other metalliferous industries operating at less that 1500° C.

EXAMPLE 5

The process as described in Examples 1 to 4 can incorporate any type of rice hull ash high carbon, 40% by mass, down to less than 1% by mass carbon.

In this Example a preferred rice hull ash is 35 to 40% carbon containing ash, the resultant tundish insulation material is high exothermic contributing approximately 6 MJ/Kg of finished pelleted product to the insulation capability of the product.

Where the end use is sensitive to carbon, a low carbon rice hull ash may be substituted.

EXAMPLE 6

The process described in Examples 1 to 5 are largely followed in this Example the Clay Ceram™ is substituted by clay plas.

EXAMPLE 7

The process described in Examples 1 to 5 are largely followed in this Example the Clay Ceram™ is substituted by bentonite (sodium modified) to less than 0.5%.

The results of various insulating materials tested are shown in Table 2.

TABLE 2

Comparative results of various insulating materials.
Tested by Refractories Centre Australia and Tested to AS 1774.10

| Sample | Ceramic Binder Type | Inclusion rate % | Rice Bran % | Fusion Temp Degrees C. |
|---|---|---|---|---|
| 1 | Bentonite (1) | 10 | 0 | 1540 |
| 2 | Bentonite (1) | 7.5 | 2.5 | 1555 |
| 3 | Bentonite (1) | 5 | 5 | 1575 |
| 4 | Bentonite (1) | 2.5 | 7.5 | 1580 |
| 5 | Bentonite (1) | 0 | 10 | 1600 |
| 6 | Clay Ceram ™ | 5 | 0 | 1565 |
| 7 | Clay Ceram ™ | 7.5 | 0 | 1555 |
| 8 | Clay Ceram ™ | 10 | 0 | 1550 |
| 9 | Clay Plas | 5 | 0 | 1500 |
| 10 | Clay Plas | 7.5 | 0 | 1500 |
| 11 | Clay Plas | 10 | 0 | 1500 |

Note:
Bentonite (1) is Sodium Modified Na < 0.5%

A higher fusion temperature is desired together with a product that does not substantially form dust in use. The preferred product made according the the present invention contained Bentonite and rice bran. Sample 5 had a high fusion temperature but tended to form dust in use and therefore was not ideal.

It will be appreciated by person skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A granular thermal insulating material comprising:
   (a) 70 to 95% by dry weight rice hull ash;
   (b) 2 to 20% by dry weight ceramic clay binder;
   (c) 0.1 to 10% by dry weight rice bran;
   (d) 0.1 to 10% by dry weight exfoliating agent; and
   (e) 1 to 10% by weight water;
wherein, in use, the insulating material exfoliates to form an expanded particulate material when exposed to a temperature of at least 1000° C.

2. The insulating material according to claim 1 comprising:
   (a) 85 to 95% by dry weight rice hull ash;
   (b) 5 to 15% by dry weight ceramic clay binder;
   (c) 2 to 5% by weight rice bran;
   (d) 0.2 to 5% by dry weight exfoliating agent; and
   (e) 1 to 5% by weight water.

3. The insulating material according to claim 2 comprising:
   (a) 85% by dry weight rice hull has;
   (b) 5% by dry weight ceramic clay binder;
   (c) 5% by weight rice bran;
   (d) 0.35% by dry weight exfoliating agent; and
   (e) 4% by total weight water.

4. The insulating material according to claim 1 wherein the ceramic clay binder is a refractory clay including ranges of the following elements:
   $SiO_2<55\%$, $Al_2O_3>20\%$, $K_2O<1\%$, $Na_2O<0.5\%$.

5. The insulating material according to claim 1 wherein the exfoliating agent is selected from the group consisting of unexpanded graphite, vermiculite, and perlite.

6. The insulating material according to claim 5 wherein the exfoliating agent is exfoliating graphite.

7. The insulating material according claim 6 comprising about 85% by dry weight rice hull ash, about 5% by dry weight ceramic clay binder, 5% by dry weight rice bran, and about 0.35% by dry weight exfoliating graphite, and about 4% by total weight water.

8. The insulating material according to claim 1 wherein the granules are in the form of pellets, disks, speres or granules.

9. A method of insulating molten steel or metal comprising adding to the molten steel or metal a granular thermal insulating material according to claim 1 such that the insulating material is caused to exfoliate on exposure to a temperature of 1000° C. or more thereby forming a thermal insulating layer over the molten steel or metal.

* * * * *